(12) United States Patent
Gallhauser et al.

(10) Patent No.: US 10,056,987 B1
(45) Date of Patent: Aug. 21, 2018

(54) SYSTEM FOR MEASURING RADIO FREQUENCY POWER

(71) Applicant: Rohde & Schwarz GmbH & Co. KG, Munich (DE)

(72) Inventors: Markus Gallhauser, Freising (DE); Werner Perndl, Zorneding (DE); Nino Voss, Munich (DE)

(73) Assignee: Rohde & Schwarz GmbH & Co. KG, Munich (DE)

(*) Notice: Subject to any disclaimer, the term of this patent is extended or adjusted under 35 U.S.C. 154(b) by 0 days.

(21) Appl. No.: 15/712,642

(22) Filed: Sep. 22, 2017

(51) Int. Cl.
*H04B 17/00* (2015.01)
*H04B 17/10* (2015.01)
*H04B 17/20* (2015.01)
*H04B 17/30* (2015.01)
*G02B 5/28* (2006.01)

(52) U.S. Cl.
CPC ........... *H04B 17/102* (2015.01); *H04B 17/20* (2015.01); *H04B 17/30* (2015.01); *G02B 5/288* (2013.01)

(58) Field of Classification Search
CPC ....... H04B 17/102; H04B 17/20; H04B 17/30
See application file for complete search history.

(56) References Cited

U.S. PATENT DOCUMENTS

| | | | | |
|---|---|---|---|---|
| 5,999,289 | A * | 12/1999 | Ihara | H04B 10/25133 356/73.1 |
| 6,108,527 | A * | 8/2000 | Urban | H04B 1/406 455/115.3 |
| 2006/0227907 | A1* | 10/2006 | Lim | H03D 5/00 375/345 |
| 2015/0256372 | A1* | 9/2015 | Sidiropoulos | H03G 3/3078 375/340 |
| 2017/0085318 | A1* | 3/2017 | Ruchet | H04B 10/07955 |

FOREIGN PATENT DOCUMENTS

EP  1914899 A2  4/2008

* cited by examiner

*Primary Examiner* — Nguyen Vo
(74) *Attorney, Agent, or Firm* — Christensen O'Connor Johnson Kindness PLLC

(57) ABSTRACT

A system for measuring radio frequency power of an incoming radio frequency signal is described, with at least one radio frequency interface for receiving the radio frequency signal, a signal processing unit for processing the radio frequency signal, a frequency selection unit for separating at least two frequency bands of the incoming radio frequency signal, the frequency selection unit comprising several filters, at least one power detector for measuring the radio frequency power of at least one of the frequency bands processed by the at least one power detector. At least one of the several filters is connected with the at least one power detector. The frequency selection unit is configured to forward the incoming radio frequency signal to at least one of the filters wherein the frequency selection unit has at least a first operation state in which the incoming radio frequency signal is forwarded to more than one filter simultaneously or subsequently.

13 Claims, 1 Drawing Sheet

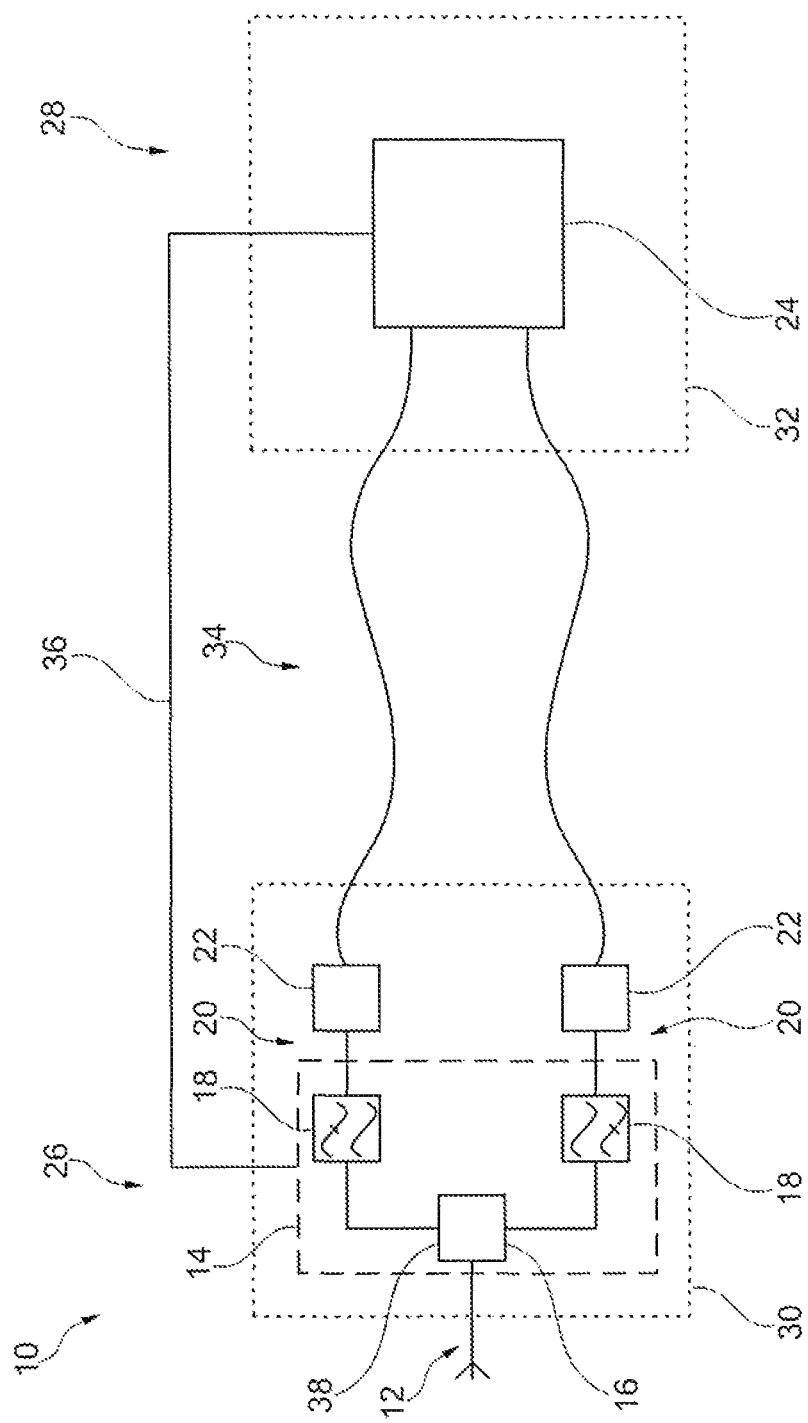

SYSTEM FOR MEASURING RADIO FREQUENCY POWER

FIELD OF THE DISCLOSURE

The disclosure relates to a system for measuring radio frequency power of an incoming radio frequency signal.

BACKGROUND

Modern communication devices that use over-the-air (OTA) technologies for transmitting signals operate at frequencies in the range between 10 and 90 GHz, for instance. Those communication devices are also called 5G communication devices due to the signal characteristics, for instance the frequency range used, that go beyond the signal characteristics of the current 4G standard, in particular with regard to the frequency range used. Accordingly, a broad frequency range can be used by those communication devices which results in a more complicated power metering of the signals transmitted by those communication devices during tests and calibrations.

The currently available power meters or power sensors are not applicable for metering these broadband signals and to distinguish between different frequency bands that occur in the radio frequency signals transmitted. Therefore, high-end spectrum analyzers have to be used in order to measure and analyze the signals transmitted by 5G communication devices, in particular in order to analyze the high-frequency portions of the signals separately (frequency bands).

However, such high-end spectrum analyzers are very expensive resulting in high costs for the measurements and analyses.

Accordingly, there is a need for a cost-efficient possibility to measure and analyze the radio frequency power of signals radiated by communication devices that use broadband signals.

SUMMARY

The present disclosure aims to address this need by providing a system for measuring radio frequency power of an incoming radio frequency signal. The system comprises:

at least one radio frequency interface for receiving the radio frequency signal;

a signal processing unit for processing the radio frequency signal;

a frequency selection unit for separating at least two frequency bands of the incoming radio frequency signal, the frequency selection unit comprising several filters;

at least one power detector for measuring the radio frequency power of at least one of the frequency bands processed by the at least one power detector;

wherein at least one of the several filters is connected with the at least one power detector, and wherein the frequency selection unit is configured to forward the incoming radio frequency signal to at least one of the filters, and wherein the frequency selection unit has at least a first operation state in which the incoming radio frequency signal is forwarded to more than one filter simultaneously or subsequently.

Accordingly, a system is provided that is configured to measure the radio frequency power of an incoming radio frequency signal irrespective of the frequency of the signal. Thus, broadband signals can be analyzed with regard to their power appropriately. This is ensured by separating the incoming radio frequency signal into several frequency bands of which at least one is processed by the power detector for measuring the radio frequency power.

According to an embodiment, two or more frequency bands may be measured simultaneously provided that the respective frequency bands assigned to corresponding channels of the system are fed to respective power detectors such that the respective radio frequency power of the frequency bands can be determined appropriately.

According to another embodiment, the different frequency bands can be measured with regard to the radio frequency power in a subsequent manner. Thus, the at least two different frequency bands are evaluated one by one.

Generally, the respective radio frequency power of two different frequency bands of the incoming radio frequency signal are measured simultaneously or subsequently in the first operation state of the system. Accordingly, the system is configured to determine the power of at least two different frequency bands within a common radio frequency signal.

According to an aspect, the frequency selection unit is configured to separate the fundamental wave of the incoming radio frequency signal and its harmonics. Thus, the fundamental wave of a 5G radio frequency signal having a frequency of 28 GHz, 39 GHz and so on may be separated from its harmonics having a frequency of 56 GHz, 78 GHz and so on. Accordingly, different signal portions of the incoming radio frequency signal can be analyzed with regard to its power separately.

According to another aspect, each filter of the frequency selection unit is connected to a respective power detector for measuring the radio frequency power of a corresponding frequency band of the incoming radio frequency signal. Thus, it is ensured that the whole radio frequency signal may be analyzed with regard to radio frequency power irrespective of the frequency band. Therefore, a broadband radio frequency signal can be metered by the system in a cost-efficient manner.

Another aspect provides that the signal processing unit is configured to process at least one output signal. The output signal corresponds to the signal that is outputted by the respective filter of the frequency selection unit that processes the signal (portion), namely the frequency band. Accordingly, the signal portion of the radio frequency signal is forwarded to a signal processing unit for further processing. Therefore, the system may also analyze the radio frequency signal with regard to other parameters than power.

The output signal may be the signal processed by the at least one power detector. The power of that signal portion (frequency band) is determined by the power detector wherein the same signal portion is forwarded to the signal processing unit for further analyses.

The radio frequency interface may be established by an antenna unit. Thus, the system is configured to receive the radio frequency signal over-the-air (OTA). Usually, the communication devices using 5G technologies transmit their signals over-the-air such that these communication devices can be analyzed in an appropriate manner.

Further, the power detector may be at least one of a diode and a thermal detector. Thus, the power of the radio frequency signal, in particular its respective signal portion, processed by the power detector can be analyzed in different manners in order to determine the respective radio frequency power.

Moreover, at least the filter connected to the power detector is a bandpass filter. Thus, a certain frequency band of the whole radio frequency signal is allowed to pass the filter that is connected to the power detector ensuring that the power detector receives only that frequency band of the whole radio frequency signal, in particular the respective spectrum.

Another aspect provides that at least the filter connected to the power detector is an adjustable filter such that the adjustable filter is configured to filter different frequency bands. Therefore, the filter that may be part of the frequency selection unit can be adjusted appropriately in order to ensure that an intended frequency band is not filtered that is forwarded to the power detector in order to determine the radio frequency power of that frequency band. The appropriate frequency band to be analyzed can be varied by setting the adjustable filter in a desired manner.

The power detector may be a broadband power detector such that different frequency bands can be processed by the power detector appropriately.

According to an aspect, the signal processing unit is configured to adjust the frequency selection unit with regard to the frequency bands processed. As already mentioned above, the signal processing unit may control the adjustable filter of the frequency selection unit in order to control the frequency band that is forwarded to the power detector.

For instance, the frequency selection unit comprises at least one of a diplexer, a switching unit, a power splitter, a divider, and a coupler. These components may be used to separate or rather split the incoming radio frequency signal into at least two signals in an intended manner. Alternatively, the incoming radio frequency signal is forwarded to an intended channel of the system that is assigned to a specific frequency band due to the filter allocated to that channel.

Depending on the component used, the system is enabled to forward the radio frequency signal, in particular the different frequency bands of the signal, to more than one filter simultaneously. For instance, this can be ensured by using a diplexer, a power splitter, a divider or a coupler.

Alternatively or supplementary, the system comprises a switching unit that is used to switch between different channels provided by the system in order to forward the incoming radio frequency signal to more than one filter subsequently. Therefore, the switching unit has at least two different switching positions that are assigned to different channels each comprising a filter assigned to a certain frequency band.

Another aspect provides that the filters of the frequency selection unit are assigned to the same radio frequency interface. Thus, the whole radio frequency signal processed by the system is received via the same interface, namely the antenna unit.

Furthermore, the power detector and the signal processing unit are housed in separately formed housings. Thus, the signal processing unit is a separately formed component of the system with respect to the power detector that is directly connected to a filter of the frequency selection unit. Accordingly, the power detector is not part of the signal processing unit, but a separately formed unit. Therefore, the system may comprise two distinctive units or devices being separately housed.

The at least one power detector is interposed between the frequency selection unit and the signal processing unit. In other words, the radio frequency power of the incoming radio frequency signal, in particular the power level of the different radio frequency bands, is measured prior to the processing by the signal processing unit.

In some embodiments, the power detector and the signal processing unit are interconnected with each other via a cable connection. Thus, the radio frequency signal, in particular the frequency bands metered by the respective power detector in an appropriate manner, is forwarded to the signal processing unit via a cable connection. This cable connection is established between the first portion (unit/device) of the system that comprises the radio frequency interface, the frequency selection unit as well as the at least one power detector and the second portion (unit/device) of the system that comprises the signal processing unit. Both portions (units/devices) of the system are housed in separately formed housings such that a cable connection is required to connect both portions appropriately.

As the system has a radio frequency interface for receiving the radio frequency signal over-the-air, the system has at least an over-the-air power meter unit for radio frequency signals. Thus, the system is configured to meter the radio frequency power of the incoming signal received over-the-air.

In addition, the system may be established by a multi-band over-the-air power sensor. Thus, the system is enabled to sense the radio frequency power of the incoming radio frequency signal having several frequency bands (multi-band). Particularly, the radio frequency power of the different frequency bands may be metered respectively.

Further, the system may be configured to process radio frequency signals having a center frequency between 10 and 90 GHz. This frequency range is typically used by communication devices using 5G technologies. Therefore, the system is enabled to meter the radio frequency power of these modern communication devices.

The incoming radio frequency signal, in particular its several frequency bands, can be analyzed with regard to the respective radio frequency power by the system in a simple and cost-efficient manner as no high-end spectrum analyzer is required.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawing, wherein:

The FIGURE shows a schematic overview of a system according to the disclosure.

DETAILED DESCRIPTION

The detailed description set forth below in connection with the appended drawing, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The FIGURE schematically shows a system 10 for measuring the radio frequency power of an incoming radio frequency signal. The system 10 has at least one radio frequency interface 12 that is established by an antenna unit in the shown embodiment. For processing the radio frequency signal received, the system 10 comprises a frequency selection unit 14 that is (for example, directly) connected to the radio frequency interface 12. Thus, the radio frequency signal received via the radio frequency interface 12 is forwarded to the frequency selection unit 14 in order to select a certain frequency band of the radio frequency signal for further processing.

In the shown embodiment, the frequency selection unit 14 has a switching unit 16 that may have several different switching positions that are each allocated to filters 18 of the frequency selection unit 14. In the shown embodiment, only two filters 18 are shown for the sake of clarity and simplicity. However, the frequency selection unit 14 may comprise more than two filters 18.

As shown in the FIGURE, the filters 18 can be established by bandpass filters that are configured to allow a certain frequency band to pass the filter whereas other signal portions are blocked appropriately. Each of the filters 18 is assigned to a respective channel 20 for processing the respective frequency bands. In some embodiments, each channel 20 comprises a power detector 22 for measuring the radio frequency power of the respective frequency band that is processed by the channel 20. This means that the power of the frequency band that is forwarded to the power detector 22 is measured while being processed by the power detector 22.

In general, the power detectors 22 may be established by a diode or a thermal detector. Accordingly, the radio frequency power can be metered in different ways. The different channels 20 may comprise different power detectors 22 such that the respective power detector 22 is optimal for the frequency band to be metered.

As shown in the FIGURE, the power detector 22 is directly connected to the respective filter 18 of the channel 20 such that the frequency band filter from the incoming radio frequency signal is directly forwarded to the respective power detector 22. Accordingly, each filter 18 of the frequency selection unit 14 is connected to respective power detector 22 such that the power detectors 22 are configured to measure the radio frequency power of the corresponding frequency band of the incoming radio frequency signal that is processed by the channel 20 assigned to the power detector 22.

Still referring to the FIGURE, all filters 18 of the frequency selection unit 14 are assigned to the same radio frequency interface 12 such that the radio frequency signal(s) is/are received via a single interface, namely the antenna unit.

The signal portions processed by the power detectors 22 are further forwarded to a signal processing unit 24 being also part of the system 10. The signal processing unit 24 processes the radio frequency signal, in particular the different radio frequency signal portions corresponding to the frequency bands, in order to gather further information.

As shown in the FIGURE, the system 10 is formed by two different parts 26, 28 that are housed in separately formed housings 30, 32. Accordingly, these parts 26, 28 may also be called units or devices of the system 10. The first part 26 encompassed by the first housing 30 comprises the radio frequency interface 12, the frequency selection unit 14 as well as the power detectors 22 whereas the second part 28 encompassed by the second housing 32 comprises the signal processing unit 24. Accordingly, the signal forwarded to the signal processing unit 24 is also called output signal as it is outputted by the first part 26.

Both separately formed parts 26, 28 are interconnected via a cable connection 34 such that the radio frequency signal processed is forwarded to the signal processing unit 24 for further processing. Thus, the radio frequency signal received by the system 10 may also be analyzed with regard to other parameters than the radio frequency power.

In the shown embodiment, a single cable is allocated to each channel 20. However, a single cable may also be used for transmitting the signals processed by the different channels 20 in order to reduce the wiring efforts.

In general, the system 10, in particular the signal processing unit 24, may have a control loop 36 that is connected to the frequency selection unit 14 such that the signal processing unit 24 is configured to control the frequency selection unit 14 with regard to the frequency bands processed. For instance, at least one of the different filters 18 may be an adjustable filter such that the frequency band allowed to pass the filter 18 may be set due to a control signal provided by the signal processing unit 24.

The signal processing unit 24 may also control the switching unit 16 in order to control the switching position assigned to the different channels 20 such that the radio frequency signal is forwarded to more than one filter 18 of the frequency selection unit 14 in a subsequent manner.

Alternatively to the switching unit 16, the frequency selection unit 14 may comprise a splitting unit 38 for splitting the incoming radio frequency signal into two or more signals. For instance, the splitting unit 38 is established by at least one of a diplexer, a power splitter, a divider, and a coupler. The splitting unit 38 splits the radio frequency signal received such that the radio frequency signal, namely the signals split, are forwarded to more than one filter 18 of the frequency selection unit 14 simultaneously such that at least two different frequency bands of the incoming radio frequency signal can be measured in parallel, for instance the frequency band of 28 GHz and 39 GHz. Particularly, the power level of these frequency bands are metered simultaneously.

In general, the frequency selection unit 14 is configured to separate the radio frequency signal received into its fundamental wave and its harmonics such that a broadband power meter is provided by the system 10. As already mentioned, the system 10 receives the radio frequency signals over-the-air such that the system 10 is an over-the-air power meter unit, in particular a multi-band over-the-air power sensor as multi frequency bands can be sensed simultaneously or in a successive manner. The system 10 is also configured to process 5G radio frequency signals that have a center frequency between 10 and 90 GHz.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A system for measuring radio frequency power of an incoming broadband radio frequency signal, said system comprising:
   at least one radio frequency interface for receiving said radio frequency signal;
   a signal processing unit for processing said radio frequency signal;

a frequency selection unit for separating at least two frequency bands of said incoming radio frequency signal, said frequency selection unit comprising several filters;

at least one power detector for measuring the radio frequency power of at least one of said frequency bands processed by said at least one power detector;

wherein at least one of said several filters is directly connected with said at least one power detector, and wherein said frequency selection unit is configured to forward said incoming radio frequency signal to at least one of said filters, and wherein said frequency selection unit has at least a first operation state in which said incoming radio frequency signal is forwarded to more than one filter simultaneously or subsequently, wherein a control loop is provided that is connected to said frequency selection unit such that said signal processing unit is configured to control said frequency selection unit with regard to the frequency bands processed, wherein at least said filter connected to said power detector is an adjustable filter such that said adjustable filter is configured to filter different frequency bands, wherein said power detector and said signal processing unit are housed in separately formed housings, wherein said system is configured to process radio frequency signals having a center frequency between 10 to 90 GHz, wherein said frequency selection unit is configured to separate the fundamental wave of said incoming radio frequency signal and its harmonics, and wherein said system is a multi-band over-the-air power sensor.

2. The system according to claim 1, wherein each filter of said frequency selection unit is connected to a respective power detector for measuring the radio frequency power of a corresponding frequency band of said incoming radio frequency signal.

3. The system according to claim 1, wherein said signal processing unit is configured to process at least one output signal outputted by the respective filter of said frequency selection unit.

4. The system according to claim 3, wherein said output signal is the signal processed by said at least one power detector so that the power of a signal portion corresponding to a certain frequency band is determined by said power detector wherein the same signal portion is forwarded to said signal processing unit for further analyses.

5. The system according to claim 1, wherein said radio frequency interface is established by an antenna unit.

6. The system according to claim 1, wherein said power detector is at least one of a diode and a thermal detector.

7. The system according to claim 1, wherein at least said filter connected to said power detector is a bandpass filter.

8. The system according to claim 1, wherein said frequency selection unit comprises at least one of a diplexer, a switching unit, a power splitter, a divider, and a coupler.

9. The system according to claim 1, wherein said filters of said frequency selection unit are assigned to the same radio frequency interface.

10. The system according to claim 1, wherein said power detector and said signal processing unit are interconnected with each other via a cable connection.

11. The system according to claim 1, wherein said system has at least an over-the-air power meter unit for radio frequency signals.

12. A system for measuring radio frequency power of an incoming broadband radio frequency signal, said system comprising:

at least one radio frequency interface for receiving said radio frequency signal;

a signal processing unit for processing said radio frequency signal;

a frequency selection unit for separating at least two frequency bands of said incoming radio frequency signal, said frequency selection unit comprising several filters;

at least one power detector for measuring the radio frequency power of at least one of said frequency bands processed by said at least one power detector;

wherein at least one of said several filters is directly connected with said at least one power detector, and wherein said frequency selection unit is configured to forward said incoming radio frequency signal to at least one of said filters, and wherein said frequency selection unit has at least a first operation state in which said incoming radio frequency signal is forwarded to more than one filter simultaneously or subsequently, wherein said frequency selection unit comprises at least one of a diplexer, a switching unit, a power splitter, a divider, and a coupler, wherein said frequency selection unit is configured to separate the fundamental wave of said incoming radio frequency signal and its harmonics, and wherein said system is a multi-band over-the-air power sensor.

13. A system for measuring radio frequency power of an incoming broadband radio frequency signal, said system comprising:

at least one radio frequency interface for receiving said radio frequency signal;

a signal processing unit for processing said radio frequency signal;

a frequency selection unit for separating at least two frequency bands of said incoming radio frequency signal, said frequency selection unit comprising several filters;

at least one power detector for measuring the radio frequency power of at least one of said frequency bands processed by said at least one power detector;

wherein at least one of said several filters is directly connected with said at least one power detector, and wherein said frequency selection unit is configured to forward said incoming radio frequency signal to at least one of said filters, and wherein said frequency selection unit has at least a first operation state in which said incoming radio frequency signal is forwarded to more than one filter simultaneously or subsequently, wherein said signal processing unit is configured to process at least one output signal outputted by the respective filter of said frequency selection unit, wherein said output signal is the signal processed by said at least one power detector so that the power of a signal portion corresponding to a certain frequency band is determined by said power detector wherein the same signal portion is forwarded to said signal processing unit for further analyses, wherein said system is configured to process radio frequency signals having a center frequency between 10 to 90 GHz, wherein said frequency selection unit is configured to separate the fundamental wave of said incoming radio frequency signal and its harmonics, and wherein said system is a multi-band over-the-air power sensor.

* * * * *